United States Patent
Mäenpää

(10) Patent No.: US 10,477,179 B2
(45) Date of Patent: Nov. 12, 2019

(54) IMMERSIVE VIDEO

(71) Applicant: Telefonaktiebolaget LM Ericsson (publ), Stockholm (SE)

(72) Inventor: Jouni Mäenpää, Nummela (FI)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 318 days.

(21) Appl. No.: 15/503,614

(22) PCT Filed: Aug. 13, 2014

(86) PCT No.: PCT/SE2014/050936
§ 371 (c)(1),
(2) Date: Feb. 13, 2017

(87) PCT Pub. No.: WO2016/024892
PCT Pub. Date: Feb. 18, 2016

(65) Prior Publication Data
US 2017/0237964 A1    Aug. 17, 2017

(51) Int. Cl.
*H04N 7/18* (2006.01)
*H04N 13/117* (2018.01)
*H04N 13/332* (2018.01)
*H04N 13/366* (2018.01)
*H04N 13/243* (2018.01)

(52) U.S. Cl.
CPC ......... *H04N 13/117* (2018.05); *H04N 13/243* (2018.05); *H04N 13/332* (2018.05); *H04N 13/366* (2018.05)

(58) Field of Classification Search
CPC .................................... H04N 13/117
USPC .......................................... 348/39
See application file for complete search history.

(56) References Cited

U.S. PATENT DOCUMENTS

| | | | |
|---|---|---|---|
| 6,492,985 B1* | 12/2002 | Mutz | G06F 3/04815 345/419 |
| 8,463,020 B1 | 6/2013 | Schuckmann | |
| 8,704,879 B1* | 4/2014 | Cheng | G06F 3/013 348/51 |
| 2005/0060421 A1* | 3/2005 | Musunuri | H04L 29/06027 709/231 |
| 2008/0286730 A1* | 11/2008 | Romero, Jr. | G09B 5/06 434/157 |
| 2008/0291201 A1 | 11/2008 | Lafon | |

FOREIGN PATENT DOCUMENTS

WO   2009/117450 A1   9/2009

OTHER PUBLICATIONS

International Search Report and Written Opinion issued in International application No. PCT/SE2014/050936, dated Dec. 11, 2014, 15 pages.

* cited by examiner

*Primary Examiner* — Leron Beck
(74) *Attorney, Agent, or Firm* — Sage Patent Group

(57) ABSTRACT

A network-implemented video processing server (100) generates an immersive video sub-stream by processing video data from at least a portion of multiple video streams carrying video data for a full immersive video scene. The processing is performed based on information representing a user's current field of vision received over a control channel between the network-implemented server (100) and a user device (200). The immersive video sub-stream carries encoded video data corresponding to a sub-portion of the full immersive video scene.

22 Claims, 10 Drawing Sheets

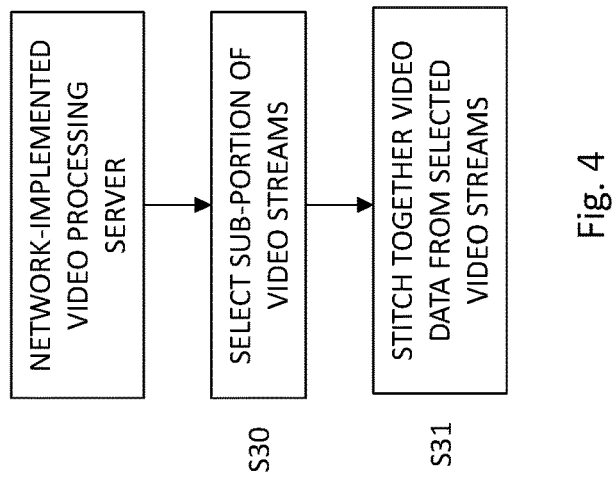
Fig. 4
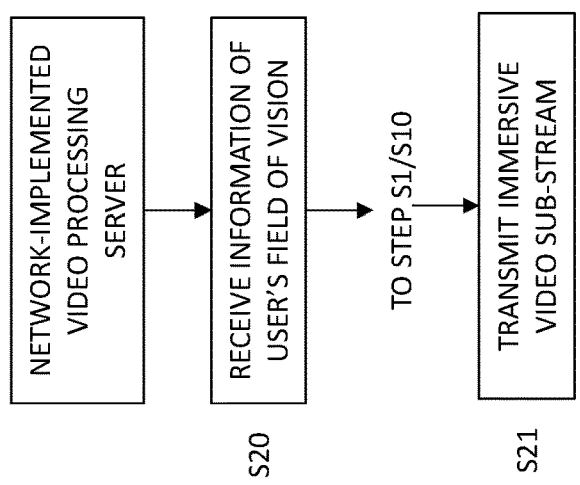
Fig. 3
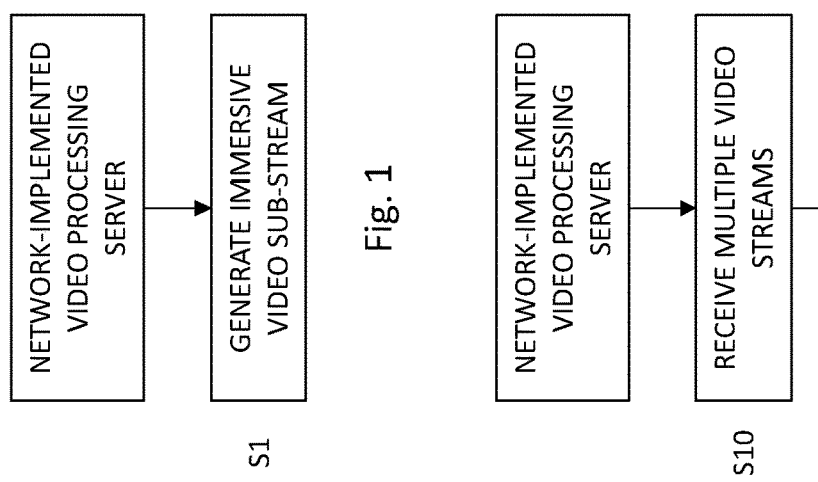
Fig. 1
Fig. 2

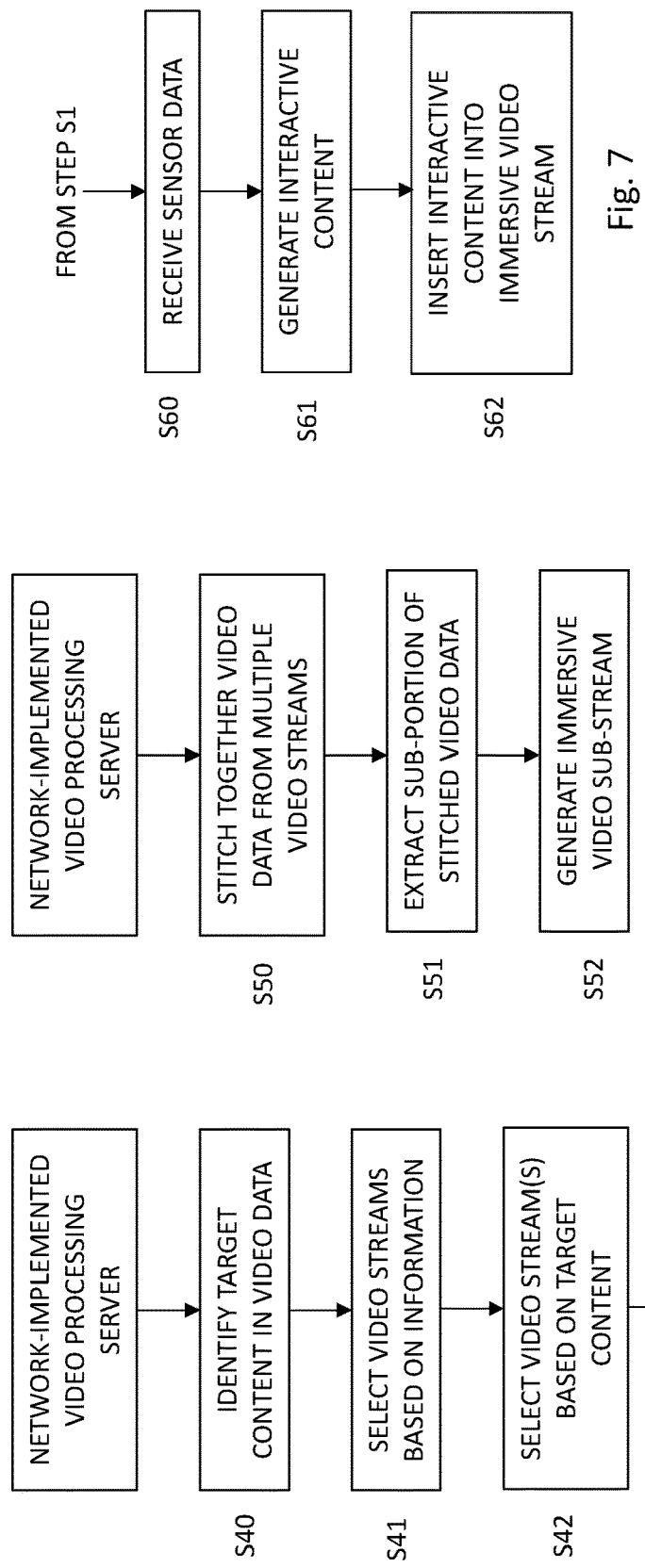

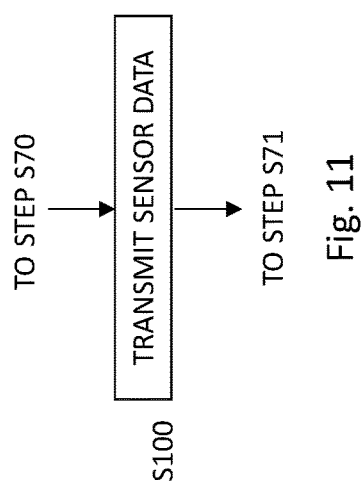
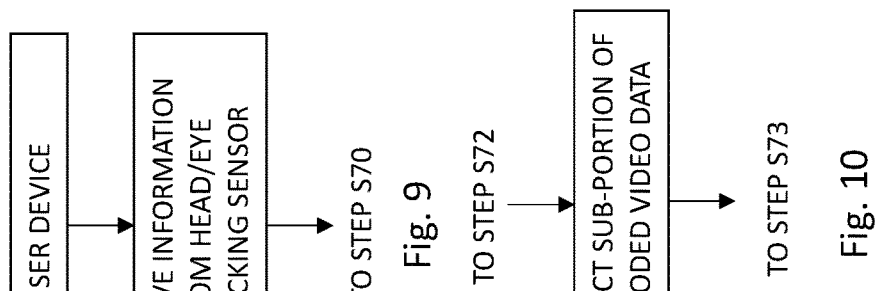
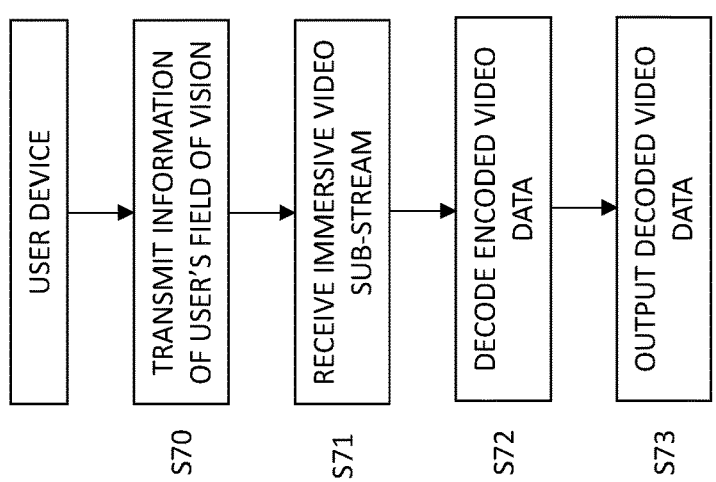
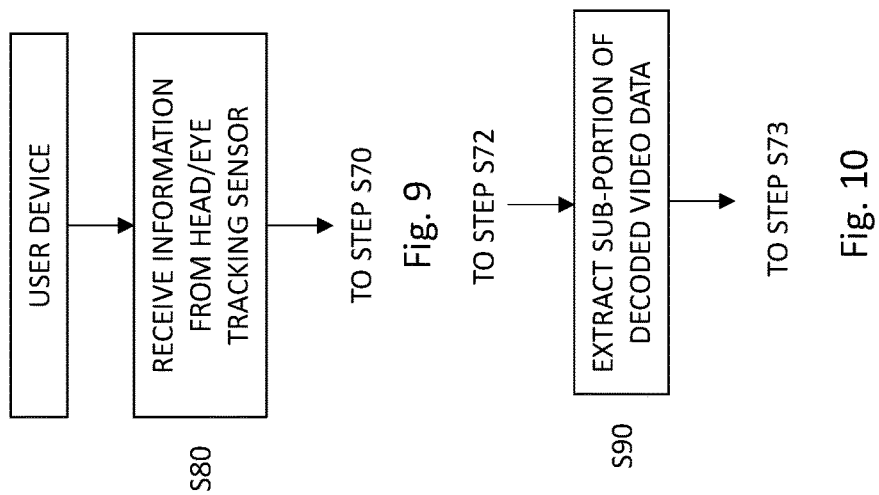

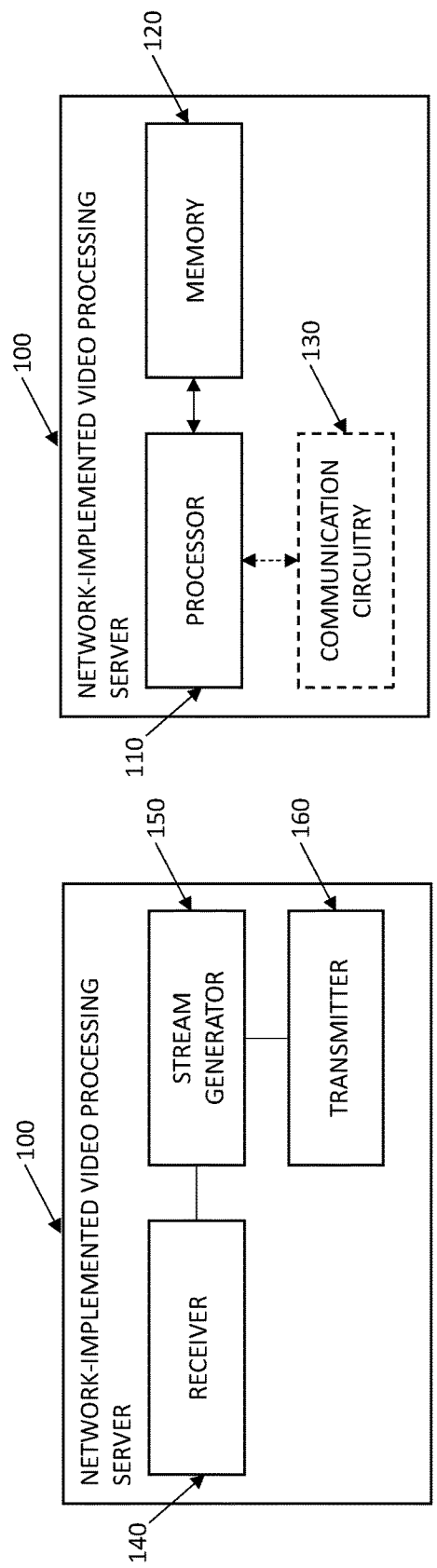

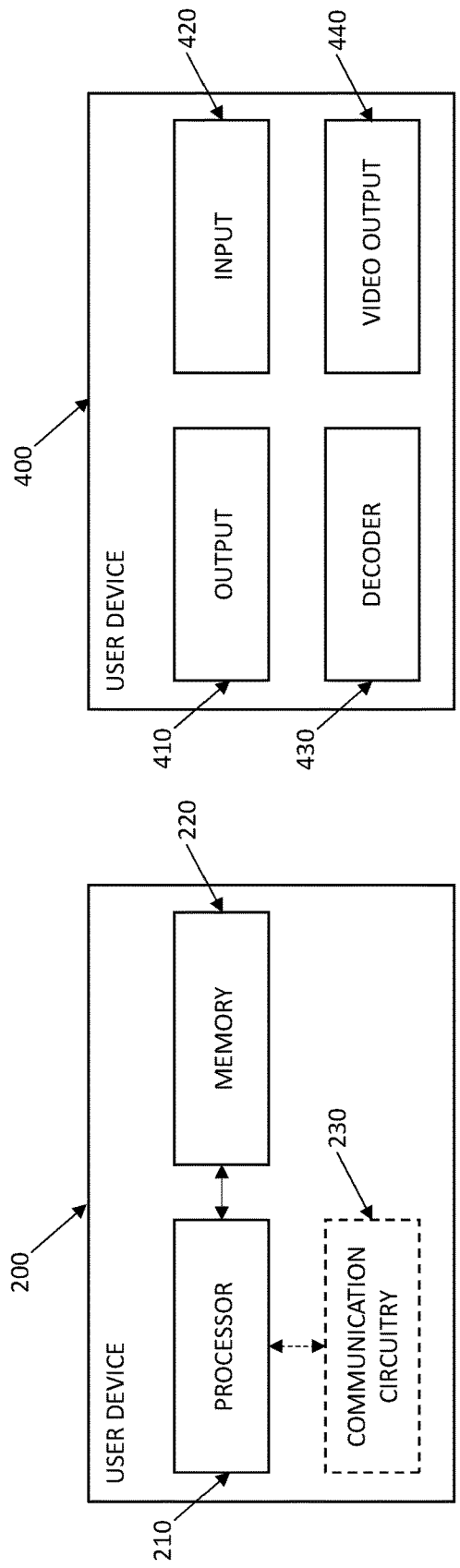

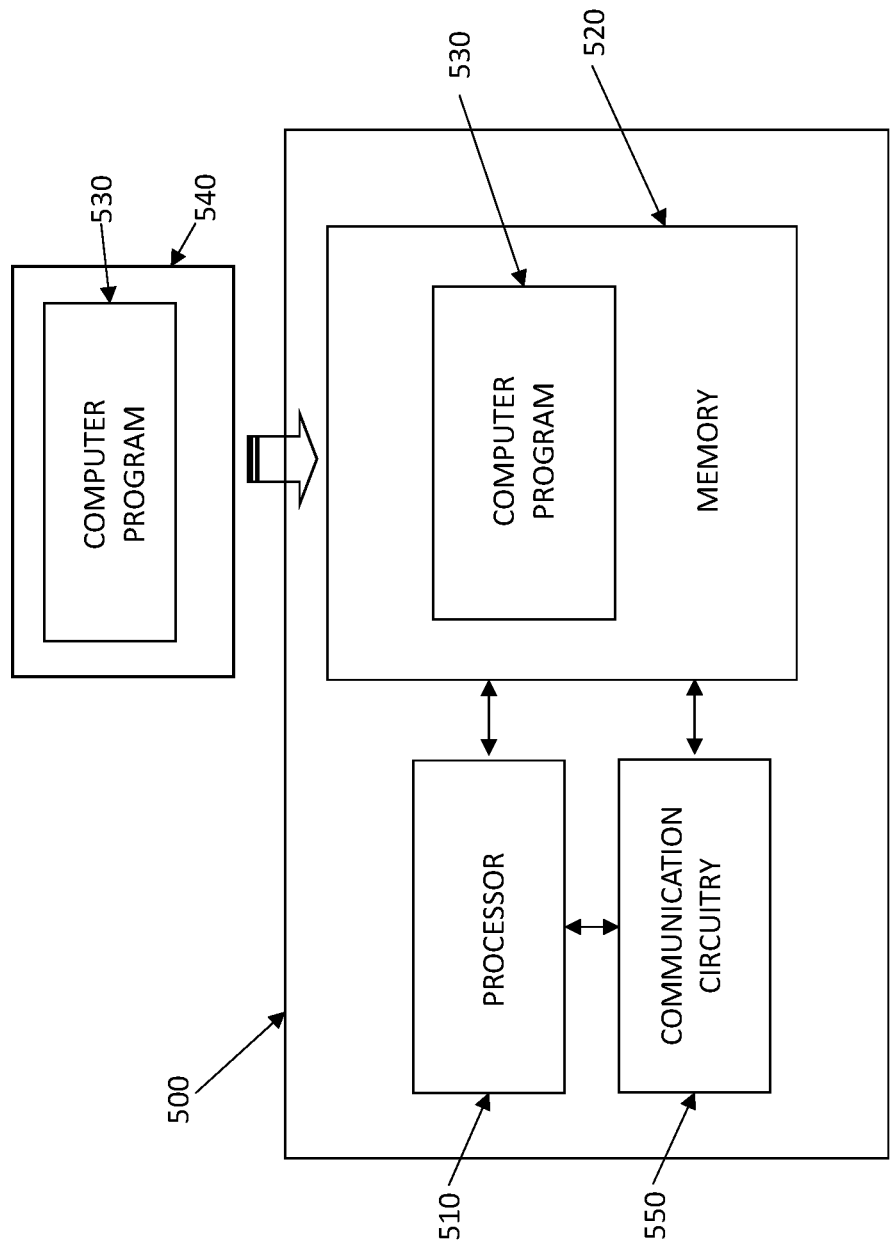

IMMERSIVE VIDEO

CROSS REFERENCE TO RELATED APPLICATION(S)

This application is a 35 U.S.C. § 371 National Stage of International Patent Application No.PCT/SE2014/050936, filed Aug. 13, 2014, designating the United States, the disclosure of which is incorporated by reference.

TECHNICAL FIELD

The present embodiments generally relate to immersive video.

BACKGROUND

Immersive video, also known as 360 degree video or spherical or panoramic immersive video, is a video recording of a real-world scene where the view in every direction is captured. During playback, the viewer has control of the viewing direction, which can be controlled via a mouse, keyboard, or head movement tracking sensors on a Head-Mounted Display (HMD), such as in the form of Virtual Reality (VR) goggles.

In an example of immersive video production, multiple cameras having overlapping fields capture all possible viewing angles. The video streams are aligned and un-distorted in a compositing server. Each video stream is processed frame by frame. Each frame, typically referred to as texture or image texture, is mapped onto polygon meshes. A polygon mesh is a projection of image textures onto polygons whose geometric vertices are arranged in a 2D or 3D coordinate system. If the server specifies a spherical view, the polygons are arranged in 3D coordinates. If a panoramic or dome projection is sufficient, the polygons are arranged in 2D coordinates.

The coordinates of the polygon meshes are calculated based on calibration data, which specifies how to rectify, rotate, and translate image textures. In the case of panoramic cylindrical projection, each image texture is wrapped and distorted into a flat cylindrical view to create a larger high-resolution video frame, typically referred to as a stitched frame or image. Finally, using the stitched frames, everything is put back into a new video stream. This process results in a stitched video covering a high resolution video cylinder. The final resolution might be for instance 8000× 3000 pixels for cylindrical video. After further processing and delivery, the video can be eventually rendered on a 360 video player client, which wraps the video within the environment of the video player to allow the user to look around herself on a display, such as smart phone, web site, or HMD.

Central Processing Unit (CPU) based video stitching is relatively time-consuming. For instance, stitching one minute of 48 frames per second (fps) video can take about 4-5 minutes on a modern PC. Using a single Graphics Processing Unit (GPU), the same can be done in about 1.5 minutes. If using multiple GPUs at the same time, the time required goes down to about 20 seconds.

There are two main techniques for capturing immersive video. The first one generates spherical or panoramic video with lenses and mirrors using a single camera. The resulting immersive video has typically very low resolution. The second one uses multiple cameras to generate separate video streams that need to be stitched together during post-production. This approach produces a higher resolution since multiple high-resolution video streams are stitched together.

The immersive video is created by stitching together video streams produced by multiple separate cameras or a single camera using multiple lenses and mirrors so that the entire 360 degree scene can be covered. The stitched video is encoded and transmitted to user devices or clients using existing codecs and protocols. The user device or client wraps the video around the cylindrical or spherical environment of the video player to allow the user to look around. There are a number of significant shortcomings with this prior art technology.

For instance, the user device or client needs to be relatively powerful in order to be capable of carrying out the processing associated with wrapping the immersive video and extracting and rendering parts of it in the display of the user device. On mobile devices, this consumes a lot of battery power. Furthermore, the immersive video needs to fit into the resolutions supported by the user devices and the codecs and protocols they use. This may result in a low resolution since the entire 360 degree scene is sent to the user device or client.

There is therefore room for improvement within the field of immersive video.

SUMMARY

It is a general objective to provide an efficient processing of immersive video.

This and other objectives are met by embodiments described herein.

An aspect of the embodiments relates to a method for processing immersive video. The method comprises a network-implemented video processing server generating an immersive video sub-stream by processing, based on information representing a users current field of vision received over a control channel between the network-implemented video processing server and a user device, video data from at least a portion of multiple video streams carrying video data corresponding to a full immersive video scene. The immersive video sub-stream carries encoded video data corresponding to a sub-portion of the full immersive video scene.

Another aspect of the embodiments relates to a method for rendering immersive video. The method comprises transmitting information representing a user's current field of vision over a control channel to a network-implemented video processing server. The method also comprises receiving, on a video transport channel, an immersive video sub-stream carrying encoded video data corresponding to a sub-portion of a full immersive video scene. The method further comprises decoding the immersive video sub-stream to form decoded video data corresponding to the sub-portion of the full immersive video scene. The method additionally comprises outputting decoded video data for display.

A further aspect of the embodiments relates to a network-implemented video processing server configured to generate an immersive video sub-stream by processing, based on information representing a user's current field of vision received over a control channel between the network-implemented video processing server and a user device, video data from at least a portion of multiple video streams carrying video data corresponding to a full immersive video scene. The immersive video sub-stream carries encoded video data corresponding to a sub-portion of the full immersive video scene.

A related aspect of the embodiments defines to a network-implemented video processing server comprising a stream generator for generating an immersive video sub-stream by processing, based on information representing a user's current field of vision received over a control channel between the network-implemented video processing server and a user device, video data from at least a portion of multiple video streams carrying video data corresponding to a full immersive video scene. The immersive video sub-stream carries encoded video data corresponding to a sub-portion of the full immersive video scene.

Yet another aspect of the embodiments relates to a user device configured to transmit information representing a user's current field of vision over a control channel to a network-implemented video processing server. The user device is also configured to receive, on a video transport channel, an immersive video sub-stream carrying encoded video data corresponding to a sub-portion of a full immersive video scene. The user device is further configured to decode the immersive video sub-stream to form decoded video data corresponding to the sub-portion of the full immersive video scene. The user device is additionally configured to output decoded video data for display.

A related aspect of the embodiments defines to a user device comprising an output for transmitting information representing a user's current field of vision over a control channel to a network-implemented video processing server. The user device also comprises an input for receiving, on a video transport channel, an immersive video sub-stream carrying encoded video data corresponding to a sub-portion of a full immersive video scene. The user device further comprises a decoder for decoding the immersive video sub-stream to form decoded video data corresponding to the sub-portion of the full immersive video scene. The user device additionally comprises a video output for outputting decoded video data for display.

A further aspect of the embodiments relates to a computer program comprising instructions, which when executed by a processor, cause the processor to generate an immersive video sub-stream by processing, based on information representing a user's current field of vision received over a control channel between the network-implemented video processing server and a user device, video data from at least a portion of multiple video streams carrying video data corresponding to a full immersive video scene. The immersive video sub-stream carries encoded video data corresponding to a sub-portion of the full immersive video scene.

Yet another aspect of the embodiments relates to a computer program comprising instructions, which when executed by a processor, cause the processor to transmit information representing a user's current field of vision over a control channel to a network-implemented video processing server. The processor is also caused to receive, on a video transport channel, an immersive video sub-stream carrying encoded video data corresponding to a sub-portion of a full immersive video scene. The processor is further caused to decode the immersive video sub-stream to form decoded video data corresponding to the sub-portion of the full immersive video scene. The processor is additionally caused to output decoded video data for display.

A related aspect defines a carrier comprising a computer program as defined above. The carrier is one of an electronic signal, an optical signal, an electromagnetic signal, a magnetic signal, an electric signal, a radio signal, a microwave signal, or a computer-readable storage medium.

The present embodiments move the computationally complex stitching of video data from the user device to a network-implemented video processing server, in which the processing is performed based on the user's current field of vision to generate an immersive video sub-stream. The user device thereby no longer needs to receive an immersive video stream carrying video data representing an entire 360 degree video scene. Instead the content to be shown on the user's display can directly be obtained from the immersive video sub-stream or be easily extracted therefrom.

BRIEF DESCRIPTION OF THE DRAWINGS

The embodiments, together with further objects and advantages thereof, may best be understood by making reference to the following description taken together with the accompanying drawings, in which:

FIG. 1 is a flow chart of a method for processing immersive video according to an embodiment;

FIG. 2 is a flow chart illustrating an additional, optional step of the method shown in FIG. 1;

FIG. 3 is a flow chart illustrating additional, optional steps of the method shown in FIG. 1;

FIG. 4 is a flow chart illustrating a method for processing immersive video according to another embodiment;

FIG. 5 is a flow chart illustrating additional, optional steps of the method shown in FIG. 4;

FIG. 6 is a flow chart illustrating a method for processing immersive video according to a further embodiment;

FIG. 7 is a flow chart illustrating additional, optional steps of the method shown in FIG. 1;

FIG. 8 is a flow chart illustrating a method for rendering immersive video according to an embodiment;

FIG. 9 is a flow chart illustrating an additional, optional step of the method shown in FIG. 8;

FIG. 10 is a flow chart illustrating an additional, optional step of the method shown in FIG. 8;

FIG. 11 is a flow chart illustrating an additional, optional step of the method shown in FIG. 8;

FIG. 15 is a block diagram of a network-implemented video processing server according to an embodiment;

FIG. 16 is a block diagram of a network-implemented video processing server according to another embodiment;

FIG. 19 is a block diagram of a user device according to another embodiment;

FIG. 20 is a block diagram of a user device according to a further embodiment; and FIG. 21 is a block diagram illustrating a computer program implementation of the embodiments.

DETAILED DESCRIPTION

Figure 12:
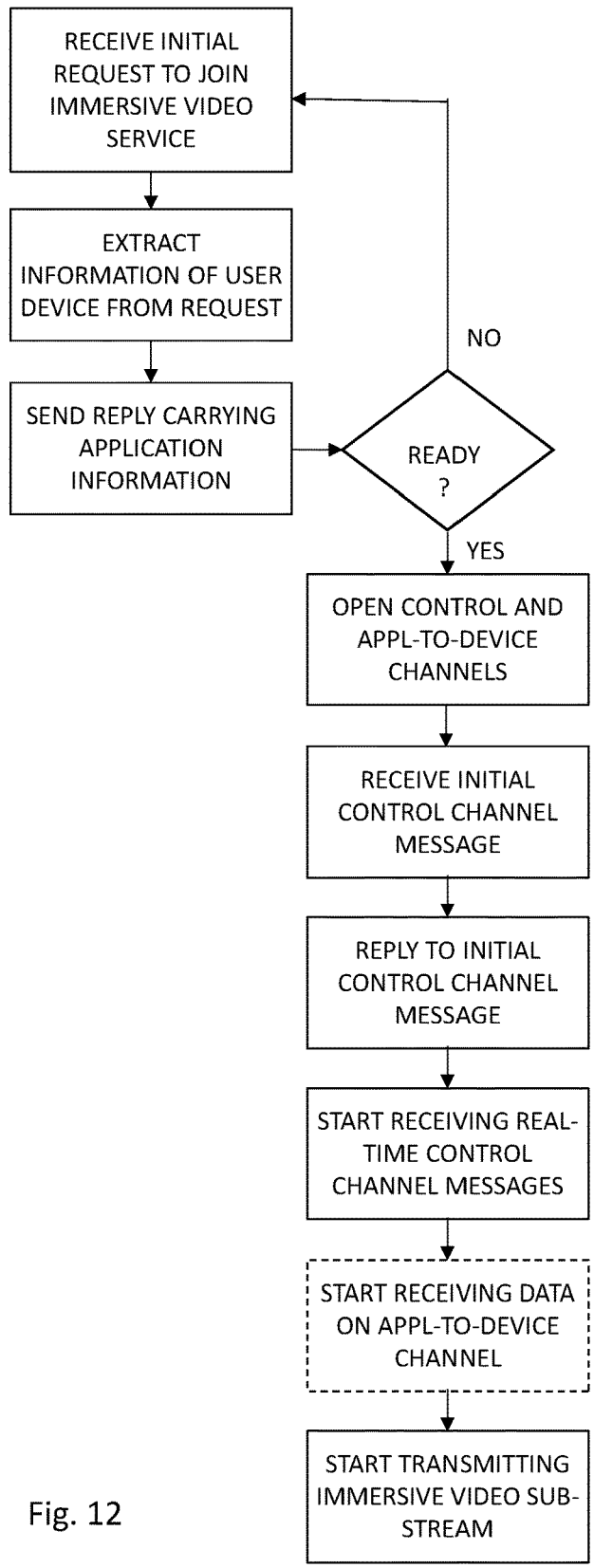
FIG. 12 is a flow chart illustrating set-up of an immersive video service according to an embodiment.

Throughout the drawings, the same reference numbers are used for similar or corresponding elements.

The present embodiments generally relate to immersive video and in particular to processing, distributing and rendering immersive video. Immersive video as used herein is video recorded for a real-world scene where the view in many, such as every direction is captured. Immersive video is also referred herein as immersive panoramic video, or simply panoramic video, for a panoramic or dome like projection of video data or immersive spherical, or simply spherical video, for a spherical projection of video data. Immersive video is also denoted 360 degree video in the art to represent that a scene is captured in every direction. The immersive video could indeed be a true 360 degree video capturing a scene in every direction or indeed a near 360 degree video where the scene is captured in most directions but not necessarily in each and every direction.

FIG. 1 is a flow chart of a method for processing immersive video according to an aspect. The method comprises a network-implemented video processing server generating, in step S1, an immersive video sub-stream by processing video data from at least a portion of multiple video streams carrying video data corresponding to a full immersive video scene. The processing of the video data is performed based on information representing a user's current field of vision received over a control channel between the network-implemented video processing server and a user device. The immersive video sub-stream carries encoded video data corresponding to a sub-portion of the full immersive video scene.

Thus, the multiple video streams carry video data corresponding to a full, complete or entire immersive video scene, typically a full, complete or entire 360 degree scene or at least close to a 360 degree scene. These means that these multiple video streams collectively carry the video data to cover the full immersive video scene captured by multiple cameras or generated using a single camera together with lenses and mirrors.

According to the embodiments the network-implemented video processing server uses information representing a user's current field of vision to generate an immersive video sub-stream that carries encoded and stitched video data corresponding to merely a sub-portion of the full immersive video scene. Hence, the video data of the immersive video sub-stream does not cover the immersive video scene from all directions as covered by all the multiple video streams taken together but only from a selected portion of the directions. This is possible by receiving information representing the user's current field of vision over a control channel between the network-implemented video processing server and the user device. This information is then used by the network-implemented video processing server to process video data from at least a portion of the multiple video streams to generate the immersive video sub-stream.

In the prior art, the user device receives an immersive video stream carrying encoded video data representing the full immersive video or 360 degree scene. According to the embodiments, the user device instead receives an immersive video sub-stream carrying encoded video data representing a sub-portion of the full immersive video or 360 degree scene.

FIG. 2 is a flow chart illustrating an additional, optional step of the method shown in FIG. 1. The method starts in step S10, which comprises the network-implemented video processing server receiving the multiple video streams carrying video data corresponding to the full immersive video scene. The method then continues to step S1 in FIG. 1 where the network-implemented video processing server generates the immersive video sub-stream by processing video data from at least a portion of these multiple video streams.

The network-implemented video processing server thereby receives the multiple video streams from a video source, such as a 360 degree camera system, a video data storage or server or from a video service provider. The multiple video streams could represent live video content, such as obtained directly from the 360 degree camera system, or previously recorded or generated video content stored in a video data server or obtained from a video service provider.

FIG. 3 is a flow chart illustrating additional, optional steps of the methods shown in FIGS. 1 and 2. The method starts in step S20 where the network-implemented video processing server receives information of the user's current field of vision over the control channel between the network-implemented video processing server and the user device. The method then continues to step S1 of FIG. 1 or step S10 of FIG. 2 and then returns to step S21. This step S21 comprises the network-implemented video processing server transmitting the immersive video sub-stream to the user device over a video transport channel.

Hence, the network-implemented video processing server preferably has two active channels for communication with the user device: a video transport channel for transmission of the immersive video sub-stream and the control channel for reception of the information representing the user's current field of vision. The network-implemented video processing server preferably also has a channel over which it receives the multiple video streams, such as from the 360 degree camera system or video service provider.

The control channel can be implemented in different ways depending, for instance, on the type of the user device and the platform that the user device uses. A non-limiting example of control channel could be a WebSocket connection between the user device and the network-implemented video processing server. WebSocket is a protocol providing full-duplex communications channels over a single Transmission Control Protocol (TCP) connection. WebSocket is designed to be implemented in web browsers and web servers but it can be used by any client or server application. Another non-limiting example is a Web Real-Time Communication (RTC) data channel. WebRTC is an Application Programming Interface (API) that supports browser-to-browser applications media communication and sharing without plugins. A bi-direction HyperText Transfer Protocol (HTTP) connection is another non-limiting example of suitable control channel. The HTTP connection could, for instance, be implemented using HTTP long polling. Also regular TCP or User Datagram Protocol (UDP) connections could be used as control channels.

The signaling protocol used within the control channel can, for instance, be Session Initiation Protocol (SIP), eXtensible Messaging and Presence Protocol (XMPP), HTTP or a proprietary protocol. The payload of the control channel protocol messages, i.e. messages carrying the information of the users field of vision, can use any suitable format. Examples include JavaScript Objection Notation (JSON) and eXtensible Markup Language (XML).

FIG. 4 is a flow chart illustrating an embodiment of implementing the generation of the immersive video sub-stream in FIG. 1. The method comprises the network-implemented video processing server selecting a sub-portion of the multiple video streams based on the information representing the user's current field of vision in step S30. The network-implemented video processing server then generates the immersive video sub-stream in step S31 by stitching together video data from the selected sub-portion of the multiple video streams.

Thus, in this embodiment the network-implemented video processing server uses the information representing the users current field of vision to select a sub-portion of the multiple video streams. Only video data from this selected sub-portion of the multiple video streams is then stitched together, encoded and used to generate the immersive video sub-stream.

This means that the network-implemented video processing server only needs to process, i.e. stitch together and encode a sub-portion of all the video data that it receives for the multiple video streams in step S10 of FIG. 2. This significantly decreases the processing required to generate the immersive video sub-stream as compared to generating an immersive video stream corresponding to the full immersive video scene.

In a particular embodiment, step S30 comprises the network-implemented video processing server selecting, based on the information representing the user's current field of vision, video streams of the multiple video streams carrying video data corresponding to an immersive video scene that is within the user's current field of vision.

Hence, in this embodiment the network-implemented video processing server uses the information received over the control channel to identify or determine which video streams of all multiple video streams received in step S10 that actually carries video data that is within the user's current field of vision. The network-implemented video processing server then stitches together the video data of these identified video streams to generate the immersive video sub-stream. This means that the immersive video sub-stream thereby only carries video data that is within the user's current field of vision.

The information exchanged on the control channel thereby allows the network-implemented video processing server to optimize its operation by stitching together only video streams from those cameras whose output is currently within the user's field of vision. Thereby instead of transmitting an immersive video stream covering a full 360 degree scene to the user device, the network-implemented video processing server transmits the immersive video sub-stream carrying video images that are within the user's field of vision and will therefore be displayed on the screen of or connected to the user device.

Since the information exchanged on the control channel allows the network-implemented video processing server to stitch together only those video streams that the user actually needs it enables a dramatic reduction in required processing power. As an example, to cover a full or entire 360 degree spherical scene, the network-implemented video processing server might need to stitch together video data from 12 different cameras and video streams. If the information representing the user's current field of vision indicates that the user's field of vision only covers the video data of two cameras, then a decrease of 83% in processing power can be achieved.

In the above described embodiment, the network-implemented video processing server directly sends the video data that is to be displayed to the user. That is, the immersive video sub-stream carries only the part of the immersive video scene that the user is currently able to see. The benefit of this approach is that the user device does not need to carry out any additional processing. However, in some scenarios it might be desirable to send to the user device not only the part of the immersive video scene that is currently within users field of vision, but instead, send a slightly larger part of the immersive video scene, i.e. an N-degree scene, where N<360, for instance N=120-150. Upon receiving the immersive video sub-stream carrying encoded video data representing the N-degree scene, the user device needs to apply some amount of local processing to extract, from the immersive video sub-stream, the images required to fill the user's field of vision. However, the benefit of doing so is that when the user moves his/her head, the field of vision can be updated locally, with reduced latency. This means that even if the user moves his/her head slightly to look at the immersive video scene from a different direction, the received immersive video sub-stream may carry the video data representing this different direction unless the user moves the head very much. Hence, the user device thereby directly has access to the video data to be displayed for this new direction since the immersive video sub-stream not only carried the video data to be displayed for the user's (previous) field of vision but a slightly broader immersive video scene. The video data for this new direction can thereby directly be displayed to the user rather than awaiting generation and transmission of new or updated information representing the user's new field of vision to the network-implemented video processing server and obtaining an updated immersive video sub-stream carrying video data of the users new field of vision.

However, while the user can directly see video data from the new direction, the user device preferably still transmits updated information to the network-implemented video processing server over the control channel to allow the network-implemented video processing server to update the video data to be included in the immersive video sub-stream in such a way that the center point of the scene represented by this video data is now reflecting the new direction of the user's head. This will enable the user device to anew extract video data if the user moves his/her head a next time.

This embodiment is therefore similar to the previously described one since the network-implemented video processing server uses the information received over the control channel to determine which video streams that carry video data that is within the user's field of vision. However, instead of generating an immersive video sub-stream carrying video data corresponding exactly to the users field of vision, the network-implemented video processing server generates an immersive video sub-stream carrying video data corresponding to a broader panoramic or spherical scene.

In this embodiment, step S30 comprises the network-implemented video processing server selecting, based on the information representing the user's current field of vision, video streams of the multiple video streams carrying video data corresponding a scene that is broader than the user's current field of vision but is smaller than the full immersive video scene.

The network-implemented video processing server then stitches together video data from the selected video streams to generate the immersive video sub-stream in step S31.

In this embodiment, the network-implemented video processing server stitches together video data representing an immersive video scene that is broader than the user's field of vision but still a subset or sub-portion of the full immersive video scene, i.e. the entire 360 degree scene.

The network-implemented video processing server could be configured to select the video data that is additional to the video data that is within the users current field of view so that the video data carried by the immersive video sub-stream represent an N-degree scene for some defined value of N, such as N=120-150. The N-degree scene is then preferably centered at the direction of the user's current field of vision and thereby extends N/2 degrees to the left and N/2 degrees to the right.

In an alternative or additional variant, the embodiment can be further optimized by predicting where the user's head will move next. Further, computer vision techniques can be applied to recognize interesting content, e.g. a Formula 1 car moving across the scene, within the full immersive video scene to estimate where the user is likely to focus his/her attention next. This information can be used to adjust the part of the video data being sent to the user.

FIG. 5 is a flow chart illustrating additional, optional steps relating to predicting where the user's head will move next. The method starts in step S40, in which the network-implemented video processing server analyzes video data of the multiple video streams and identifies a target content in the analyzed video data. The method continues to steps S41 and S42, which can be performed serially in any order or at least partly in parallel. Step S41 comprises the network-implemented video processing server selecting, based on the information representing the user's current field of vision, video streams of the multiple video stream carrying video data corresponding to an immersive video scene that is within the user's field of vision. Step S42 comprises the network-implemented video processing server selecting at least one video stream of the multiple video streams carrying video data corresponding to the identified target content. The method then continues to step S31 where video data of the video streams selected in steps S41 and S42 are stitched together.

Hence, in this embodiment the immersive video sub-stream carries video data corresponding to the user's current field of vision and video data corresponding to the target content. The immersive video sub-stream thereby contains video data that represents the current field of vision and the immersive video scene that the user is currently seeing together with video data for the direction or scene part towards which the user is likely to move his/her head to see the target content. This means that the user device will have access to the video data for this new direction or scene part already in the immersive video sub-stream and can display it directly to the user once he/she moves the head in that direction.

The target content could be any content that the user is likely to focus on. Examples could be a Formula 1 car for video content representing a car racing competition, a ball for video content representing a football match, etc.

In some cases, the network-implemented video processing server might wish to avoid the need to carry out the video stitching separately for every user in case there are multiple users viewing the same video content. In such a case, the network-implemented video processing server first stitches together video data from all the multiple video streams and cameras to create a full immersive video scene, such as spherical or cylindrical (360 degree) scene. Having done so, the network-implemented video processing server uses the information received from each user on the control channels to crop, i.e. extract, from the full immersive video scene only those parts that are currently within the users' field of vision. The extracted sub-views are then wrapped within the users' environment and delivered to the users as a respective immersive video sub-stream.

FIG. 6 is a flow chart illustrating an embodiment of implementing the generation of the immersive video sub-stream in FIG. 1. The method comprises the network-implemented video processing server stitching together, in step S50, video data from the multiple video streams to form the full immersive video scene. In a next step S51 the network-implemented video processing server extracts a sub-portion of the stitched video data from the multiple video streams based on the information representing the user's current field of vision. The network-implemented video processing server then generates, in step S52, the immersive video sub-stream based on the extracted sub-portion of the stitched video data.

This means that in this embodiment the network-implemented video processing server stitches together video data from all of the video streams to form the full immersive video scene. It then uses the information received over the control channel to extract a sub-portion of the stitched video data. This extracted sub-portion is then encoded and used to generate the immersive video sub-stream.

The network-implemented video processing server can thereby use the same stitched together video data to extract different sub-portions and thereby generate different immersive video sub-streams based on information received from different user devices.

The network-implemented video processing server thereby stitches all the video streams together to form a complete or full immersive video scene. Based on the information received over the control channel, the network-implemented video processing server crops or extracts the sub-portion corresponding to the user's field of vision from the full immersive video scene, wraps the resulting panoramic or spherical video data within the users environment and transmits it to the user device as the immersive video sub-stream. This embodiment is an efficient approach, for instance, when there is a need to avoid user-specific video stitching operations at the network-implemented video processing server.

The sub-portion of the stitched video data that is extracted in step S41 could correspond to the users current field of vision or corresponding to an immersive video scene that is broader than the user's current field of vision but smaller than the full immersive video scene similar to discussed above in connection with FIGS. 4 and 5.

Hence, in an embodiment the network-implemented video processing server extracts, in step S51 and based on the information representing the user's current field of vision, a sub-portion of the stitched video data from the multiple video streams corresponding to an immersive video scene that is within the user's current field of vision.

In another embodiment, the network-implemented video processing server extracts, based on the information representing the user's current field of vision, a sub-portion of the stitched video data corresponding to an immersive video scene that is within the user's current field of vision and extracts a sub-portion of the stitched video data corresponding to an identified target content.

The embodiments in which the immersive video sub-stream carries encoded video data representing the immersive video scene corresponding to the user's field of vision reduce the amount of processing that the user device needs to carry out. The user device no longer needs to receive the full immersive video stream corresponding to the full immersive video scene. Instead, the video data to be shown on the display of the user device is transmitted directly from the network-implemented video processing server. This saves a significant amount of processing power on the user device. Further, it makes it possible to utilize immersive video on less powerful devices, including battery-powered user devices.

In addition, the fact that only a subset of the full immersive video scene needs to be delivered to the user device makes it possible to use significantly higher video resolutions for the transmitted video data since the full resolution can be used for the user's field of vision.

The control channel introduced provides the network-implemented video processing server with complete information about what the user is viewing in the 360 degree video environment. This allows the network-implemented video processing server to personalize the video scene delivered to the user.

The lag time between the user turning his/her head and the change being reflected in the immersive video sub-stream coming from the network-implemented video processing server should be low.

In fast-phased virtual reality action games, to achieve a feeling of responsiveness, a latency of 50 ms or less is desired between the user turning her head and the movement being reflected in the video shown on his/her display. A latency of 60 ms is commonly cited as the preferred upper limit for acceptable virtual reality computer gaming. To achieve imperceptible latency, the latency should be 20 ms or less. It should be noted that these figures are recommendations for fast-phased action games where the user is typically making very rapid head movements. Higher latencies are acceptable for the slower-phased immersive video cases. According to immersive video studies, a latency of less than 200 ms is enough to avoid simulator sickness.

In general, the components of the end-to-end delay for the immersive video service include:
  Network delay: the round-trip time of the user device sending a command to the network-implemented video processing server and resulting action reaching the user device;
  Processing delay: the time between the network-implemented video processing server receiving the command and the network-implemented video processing server responding; and
  Play-out delay: the time between the user device receiving an encoded video frame, and the frame being decoded and presented on the display of the user device.

If assuming very low round-trip and processing times, the minimum latency caused by the video encoding and decoding is determined by the frame rate. When the frame rate is 60 fps, the minimum latency would be 35 ms (or less if using an even higher frame rate). Thus, this would still leave at least ms or 165 ms for the network delay and other processing if aiming for the 60 ms or 200 ms delay limit, respectively. Further, there are technologies that can be used to reduce the impact of the processing and play-out delays:
  Extrapolation of sensor data using models of the motion of the human head to compensate for the end-to-end delay. Modern prediction techniques can reduce the latency by 20-40 ms.
  Ability to perform video stitching in real-time: video stitching software that makes use of multiple GPU accelerators in parallel can perform real-time stitching. Present embodiments further reduce stitching delays since they allow the network-implemented video processing server to stitch together only the video streams that are in the user's field of vision.
  Time warping: time warping is a post-processing task that, based on latest head-tracking sensor data, calculates a transformation that warps a video frame into a position that approximates where it would be with the latest sensor data. Time warping can be performed either on the network-implemented video processing server or on the user device. Time warping can remove up to 30-40 ms from the latency.

The following technologies can be used to reduce the network delay:
  1 ms latency even in the radio access network: the 5G radio access network will according to current estimates allow a 1 ms level latency.
  Software-Defined Networking: SDN will support configuring appropriate state in the network to allow prioritized treatment for the control channel and the immersive video sub-streams sent to the user device.
  Distributed cloud environment: in a distributed cloud environment consisting of multiple geographically distributed data centers, the virtual machines carrying out the stitching operation can be placed to a data center as close to the user as possible to reduce the delays further.

The above-mentioned technologies can bring the latency of the immersive video service down to (or at least close to) the level of 360 degree video rendering performed locally on the user's device.

In an embodiment, the information exchanged on the control channel allows the network-implemented video processing server to personalize video data for the user and other users viewing the same video content. This makes it possible to add interactive content to the immersive video, that is, the user can interact with the immersive video environment.

For instance, the information contained in the messages sent over the control channel can include, but are not limited to:

Head tracking information to indicate among other things the pan, tilt, and roll of the user's head. The head tracking information can consist of data, for instance, from a gyroscope, compass, magnetometer, and/or accelerometer. The network-implemented video processing server uses this information to determine what video data it needs to stitch together to fill the user's field of vision.

Data from magnetic motion trackers attached to the user's arms and legs can also be included in the messages. The purpose of this data is to make the network-implemented video processing server aware of, for instance, the gestures the user is making with her hands.

Alternatively, or in addition, gaze direction recognition data can be used by the network-implemented video processing server to determine where the user has currently focused her gaze.

Also, or alternatively, data from a motion-tracking device or video camera following the user could be used. The purpose of this data is to make the network-implemented video processing server aware of the full body motion of the user.

In the above described examples, outputs from various sensors, such as gyroscope, compass, magnetometer, accelerometer, magnetic motion trackers, gaze direction recognition device, motion-tracking devices or cameras, can be used as the information representing the user's current field of vision. In other examples, the user controls its current field of vision by activation of a user input device, such as mouse, keyboard or joystick. In such a case, the user input device generates an output signal that represents the desired field of vision of the user.

Also other types of data can be exchanged between the user device and the network-implemented video processing server using the messages transmitted over the control channel or using messages transmitted over dedicated device-to-server media channels.

For instance, data from electromyography (EMG) muscle activity sensors that sense the electrical potential generated by muscles controlling the user's fingers could be used to convey the finger position and grip strength to the network-implemented video processing server. This data makes it possible for the network-implemented video processing server to allow the user to interact with virtual objects within the immersive video scene.

Thus, in addition to the control channel between the user and the network-implemented video processing server, one or more device-to-server media channels carrying data or media, such as audio and video, can be established between the user device and the network-implemented video processing server. As an example, the audio captured by the microphone of the user device or a connected external microphone may be sent to the network-implemented video processing server. The network-implemented video processing server can mix the user's audio into the overall 3D sound environment of the immersive video so that other users viewing the same immersive video broadcast can hear what the user is saying.

As another example, the video captured by the user's motion-tracking video camera may be sent to the network-implemented video processing server. The network-implemented video processing server can use the video from the user device, for instance, to copy the user's movements in the movements of an avatar representing the user within the immersive video scene.

The device-to-server media channel may use existing protocols and standards including, for instance, the Real-Time Protocol (RTP) and the WebRTC PeerConnection to upstream the user's audio and video to the network-implemented video processing server.

As described above, the network-implemented video processing server can utilize head tracking data submitted on the control channel to generate appropriate immersive video data for the displays on the user device. In addition, the additional data described above allows the network-implemented video processing server to let the user interact with the immersive video environment as will be discussed below.

Let us assume a use case where a group of friends each of whom is located in a different city wishes to view a soccer match together. Each user is following the match from his or her home using a respective user device, such as HMD. The HMDs, or the computers to which the HMDs are connected, have set up control and device-to-server media channels to the network-implemented video processing server running as virtual machines in the cloud. The company broadcasting the match has placed a number of 360 degree cameras around the soccer arena. This makes it possible for users wearing HMDs to virtually sit in the audience. Let us further assume that the friends in our example want to sit virtually next to each other in the same row of seats in the soccer arena. They also want to be able to see each other and interact with each other. The control and device-to-server media channels between the user and the network-implemented video processing server allow such interaction.

The audio stream from each user's microphone that is sent to the network-implemented video processing server over the device-to-server media channel can be mixed to the overall audio stream sent to each individual user. This allows the friends to hear and speak to each other.

Each user can be represented in the virtual row of the soccer arena by a virtual avatar generated using computer graphics or a combination of computer graphics, real-time video captured of the user, and photos of the user. This allows a user to look around and see his/her friends' avatars. The network-implemented video processing server inserts the generated avatars to the immersive video delivered to the users. The lips of an avatar can be made to move in synch with the corresponding users speech.

The information sent on the control channel from each user's motion trackers or, alternatively, motion data sent over the user's device-to-server channel is translated into her avatars virtual arm and leg movements. As an example, a user can turn to his/her friend and point into some interesting development in the match with his/her virtual hand. The gaze direction data sent on the control channel allows the avatars to make eye contact. The EMG sensor data allows the avatars to make signs with their hands and fingers.

FIG. 7 is a flow chart illustrating additional, optional steps of the method as shown in FIG. 1. The method continues from step S1 in FIG. 1. In a next step S60, the network-implemented video processing server receives sensor data over a device-to-server media channel. The network-implemented video processing server generates, in step S61, interactive media content based on the sensor data. The network-implemented video processing server then inserts the interactive media content in the immersive video sub-stream.

The interactive media content could be audio and/or video content, such as audio content representing the voice of a user recorded by a microphone of or connected to the user's user device and transmitted to the network-implemented video processing server over the user's device-to-server media channel. Video content could represent an avatar of a user and where the movement of the avatar is controlled by the network-implemented video processing server based on sensor data received from a user device over the device-to-server media channel.

Thus, the control channel can also be used to send additional types of information, such as motion tracking data to the network-implemented video processing server, or this additional information is transmitted over another channel, i.e. the device-to-server media channel. This makes it possible for the user to interact with his/her environment within the immersive video scene. The device-to-server media channel(s) that can be used together with the control channel enable(s) the user, for instance, to have virtual discussions with other viewers of the immersive video.

As described in the foregoing, there are multiple benefits associated with using the control channel to determine which parts of the immersive scene to transmit to the user device. Examples include reduced processing required on the user device, possibility to use significantly higher resolution, personalization, and interactive features. The additional cost is that video stitching needs to be carried out individually for each user. In some scenarios, this might not be practical. An example would be a scenario where the network-implemented video processing server has only a limited amount of computing capacity available. In such a case, the network-implemented video processing server can operate by stitching together video data from all of the multiple video streams and then individually, for each user or for each group of user, extract the relevant sub-portion of the stitched video data.

Another approach to provide sufficient computing capacity is to have a hierarchical processing in a distributed cloud environment. In this approach, a powerful server in a central location with access to hardware acceleration stitches together all the video data in the cloud without doing any personalization and broadcasts the resulting immersive video stream to local virtual machines running in locations, such as data centers of the distributed cloud, closer to the users. The local virtual machines then extract the sub-portion of the stitched video data to the users, apply personalization, and send the result as an immersive video sub-stream to the user devices. In this approach, there is still an option to perform individual processing to every user by the local virtual machines. However, the task of extracting the relevant sub-portion from the stitched video data requires less processing power than carrying out stitching individually for each user. A disadvantage might be that the resolution of the extracted video data is lower than when stitching is performed separately for each user.

In a further approach, the network-implemented video processing server can identify, based on information received on the control channels, and group together users who are currently viewing roughly the same part of the immersive video scene and broadcast the same immersive video sub-stream to the entire group. It is enough that the users are looking at roughly the same part of the immersive video scene, in particular if the immersive video sub-stream carries video data not only representing the user's current field of vision but rather a slighter broader or wider immersive video scene as previously described herein. In this approach, personalization, if any, can be applied as a later processing step at each user device. This approach can be useful for instance in a situation where a large number of users are, for instance, following an ice hockey match from the same virtual location within the hockey arena with their eyes following the movements of the hockey puck and thus each user is looking at the same part of the scene.

FIG. 8 is a flow chart illustrating a method for rendering immersive video. The method starts in step S70, in which information representing a users current field of vision is transmitted over a control channel to a network-implemented video processing server. In a next step S71, an immersive video sub-stream is received on a video transport channel. The immersive video sub-stream carries encoded video data corresponding to a sub-portion of a full immersive video scene. The immersive video sub-stream is decoded in step S72 to form decoded video data corresponding to the sub-portion of the full immersive video scene. The decoded video data is then output in step S73 for display.

The method as shown in FIG. 8 is typically performed by a user device communicating with the network-implemented video processing server over the control channel and the video transport channel. The user device then provides the network-implemented video processing server with information of the user's current field of vision to enable the network-implemented video processing server to provide the immersive video sub-stream with stitched and encoded video data representing a sub-portion of the full immersive video scene. The encoded video data of the immersive video sub-stream is then decoded and output for display on a screen or display of or connected to the user device.

FIG. 9 is a flow chart illustrating an additional, optional step of the method as shown in FIG. 8. Step S80 of FIG. 9 comprises receiving the information of the user's current field of vision from a head or eye tracking device.

The user device then comprises or is connected to such a head or eye tracking device that continuously, periodically or intermittently determines the user's current field of vision based on the current position of the user's head and/or eyes. Non-limiting examples of such head or eye tracking devices include HMDs or so-called Virtual Reality (VR) goggles.

In an embodiment, step S71 of FIG. 8 comprises receiving, on the video transport channel, the immersive video sub-stream carrying encoded video data corresponding to an immersive video scene that is within the user's current field of vision as represented by the information transmitted in step S70.

In this embodiment, the immersive video sub-stream thereby only carries the stitched video data that corresponds to the user's current field of vision.

In another embodiment, step S71 of FIG. 8 comprises receiving, on the video transport channel, the immersive video sub-stream carrying encoded video data corresponding to an immersive video scene that is broader than the user's current field of vision but is smaller than the full immersive video scene. In this embodiment, the method preferably comprises the additional step as shown in FIG. 10. The method thereby continues from step S72 in FIG. 8. The next step S90 comprises extracting a sub-portion of the decoded video data corresponding to an immersive video scene that is within the user's current field of vision based on the information. The method then continues to step S73, which comprises outputting the extracted sub-portion of the decoded video data for display.

In this embodiment, the immersive video sub-stream thereby carries stitched video data that corresponds to a broader immersive video scene than the users current field of vision but still smaller than the full 360 degree scene. The relevant sub-portion corresponding to the user's current field of vision is then extracted in step S90 to merely output this relevant sub-portion for display.

FIG. 11 is a flow chart illustrating an additional, optional step relating to the case with providing interactive content for an immersive video session. The method continues from step S70 in FIG. 8. In a next step S100 sensor data is transmitted over a device-to-server media channel to the network-implemented video processing server. In such a case, step S71 preferably comprises receiving, on the video transport channel, the immersive video sub-stream carrying the encoded video data and interactive content generated based on the sensor data.

The interactive content can be audio and/or video content, for instance, representing the voice of the user, movement of an avatar of a user, etc.

FIG. 12 is a flow chart illustrating set-up of an immersive video service when a new user joins an immersive video service.

Step 1: A network-implemented video processing server receives an initial request to join the immersive video service from a user device. The initial request contains details about the user device, such as audio and video codecs, resolution, transport addresses and ports for the immersive video streams, and for control and device-to-server media channels, etc. Depending on the implementation, these details might be described in a Session Description Protocol (SDP) session description, JSON, XML, or a proprietary format.

Step 2: The network-implemented video processing server extracts information about the user device from the initial request.

Step 3: The network-implemented video processing server returns a response to the initial request to the user device. The response attempts to conclude the negotiation about transport addresses and ports, codecs to be used on the device-to-server media channels, etc. After this step, the negotiation about the channels finishes if the device and server have reached an agreement about all the details (move forward to Step 4). If not, the user device will send a new request (return to Step 1).

Step 4: The control channel between the network-implemented video processing server and the user device is opened.

Step 5: The network-implemented video processing server receives the initial control channel message from the user device. The control channel message preferably describes, among other, the types of sensors that the user device has or is connected to.

Step 6: The network-implemented video processing server replies to the initial control channel message.

Step 7: The network-implemented video processing server starts receiving real-time control channel messages carrying sensor data, i.e. information representing the user's current field of vision, from the user device.

Step 8: The network-implemented video processing server optionally starts receiving data on the device-to-server media channel(s) if any.

Step 9: The network-implemented video processing server starts sending video and audio streams, i.e. the immersive video sub-stream, to the user device and optionally adding interactive content to the immersive video sub-stream.

Figure 13:
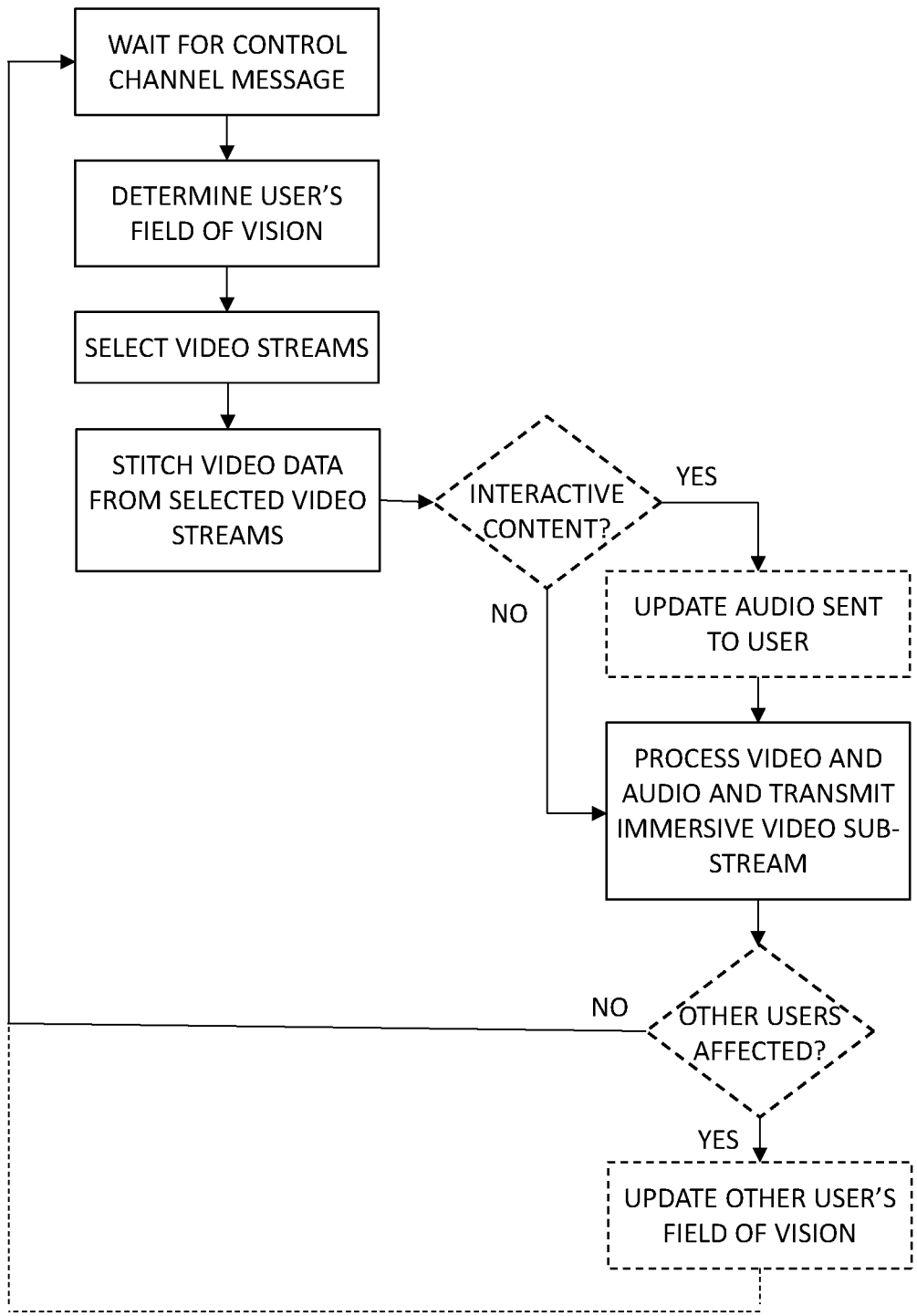
FIG. 13 is a flow chart of a method for processing immersive video according to yet another embodiment.

FIG. 13 is a flow chart illustrating a method for processing immersive video according to an embodiment. This method is preferably conducted once an immersive video session has been established as shown in FIG. 12.

Step 1: The network-implemented video processing server is waiting for new control channel messages. The network-implemented video processing server receives a new control channel message carrying data in its payload. The data contains, among other things, sensor data from the sensors, e.g. gyroscope, compass, accelerometer used for head motion tracking, of the user device, i.e. the information representing the user's current field of vision, and optionally additional data such as readings from other sensors.

Step 2: Based on the new data, the network-implemented video processing server determines which part of the 360 degree scene that is currently within the users field of vision.

Step 3: The network-implemented video processing server determines the video streams or cameras whose video data is required for the part of the scene that is within the user's field of vision.

Step 4: The network-implemented video processing server stitches together the video data from the video streams or cameras identified in Step 3.

Step 5: The network-implemented video processing server determines if there is additional sensor data from the messages, e.g. data from magnetic motion trackers attached to the users arms, which should be used to add interactive content. In such a case, the network-implemented video processing server inserts interactive content to the stitched video data. The interactive content can be, for instance, movement of the arms of the user's avatar and movements of other avatars around the user.

Step 6: The network-implemented video processing server optionally updates the 3D audio being sent to the user based on the received sensor data.

Step 7: The network-implemented video processing server carries out additional processing, e.g. compression, packetization, etc., for the video and audio and streams to form the immersive video sub-stream that is transmitted to the user device.

Step 8, 9: If necessary, the network-implemented video processing server uses the data received from the user to update other immersive video of other users that may watch the same immersive video.

The network-implemented video processing server is preferably a video processing server implemented in a network. For instance, the network-implemented video processing server could be a cloud-based or cloud-implemented video processing server or application. The cloud-based or cloud-implemented video processing application could then be executed on one or more virtual servers and thereby have access to cloud-based computing resources. Alternatively, or in addition dedicated hardware arranged in a network could be used to implement the network-implemented video processing server.

Figure 14:
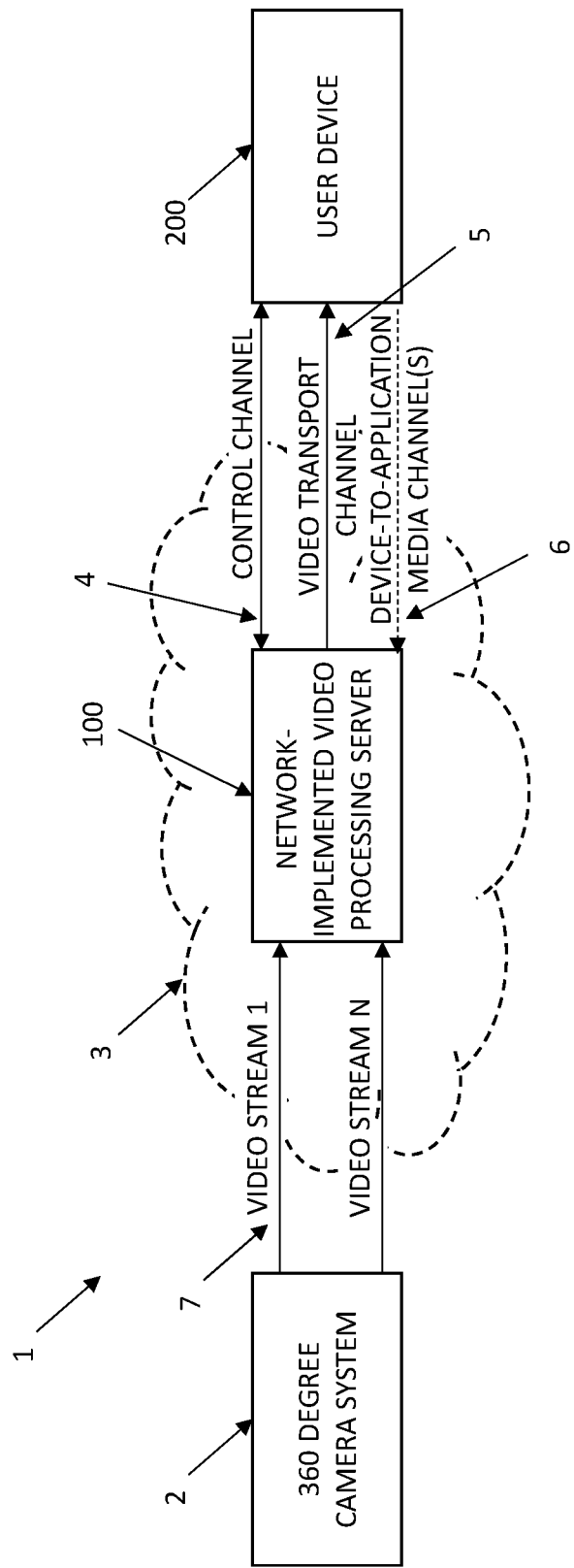
FIG. 14 is an overview of a system for providing immersive video according to an embodiment.

FIG. 14 is an overview of a system 1 for providing immersive video according to an embodiment. The system 1 comprises a 360 degree camera system 2 that is transmitting or streaming a number of video streams (one per camera) over a media channel 7 to the network-implemented video processing server 100 for processing. In an embodiment, the network-implemented video processing server 100 comprises a number of virtual machines, possibly supported by dedicated hardware, running in a network or the cloud 3. The virtual machines take care of operations, such as video stitching, audio mixing, video compression, insertion of graphical objects to the video, etc. A number of channels 4, 5, 6 are established between the network-implemented video processing server 100 and the user device 200, including a control channel 4, one or more video transport channels 5 for the immersive video sub-stream and optionally device-to-server media channels 6.

An aspect of the embodiments relates to a network-implemented video processing server configured to generate an immersive video sub-stream by processing, based on information representing a user's current field of vision received over a control channel between the network-implemented video processing server and a user device, video data from at least a portion of multiple video streams carrying video data corresponding to a full immersive video scene. The immersive video sub-stream carries encoded video data corresponding to a sub-portion of the full immersive video scene.

In an embodiment, the network-implemented video processing server is configured to receive the multiple video streams carrying video data corresponding to the full immersive video scene.

In an embodiment, the network-implemented video processing server is configured to receive the information of the user's field of vision over the control channel. The network-implemented video processing server is also configured to transmit the immersive video sub-stream to the user device over a video transport channel.

In an embodiment, the network-implemented video processing server is configured to select a sub-portion of the multiple video streams based on the information of the user's field of vision. The network-implemented video processing server is configured to generate the immersive video sub-stream by stitching together video data from the selected sub-portion of the multiple video streams.

In an embodiment, the network-implemented video processing server is configured to select, based on the information of the user's field of vision, video streams of the multiple video stream carrying video data corresponding to an immersive video scene that is within the users current field of vision.

In an embodiment, the network-implemented video processing server is configured to select, based on the information of the user's field of vision, video streams of the multiple video streams carrying video data corresponding to an immersive video scene that is broader than the user's current field of vision but is smaller than the full immersive video scene.

In an embodiment, the network-implemented video processing server is configured to analyze video data of the multiple video streams and identify a target content in the analyzed video data. The network-implemented video processing server is also configured to select, based on the information of the user's field of vision, video streams of the multiple video streams carrying video data corresponding to an immersive video scene that is within the user's current field of vision. The network-implemented video processing server is further configured to select at least one video stream carrying video data corresponding to the identified target content.

In an embodiment, the network-implemented video processing server is configured to stitch together video data from the multiple video streams to form the full immersive video scene. The network-implemented video processing server is also configured to extract a sub-portion of the stitched video data from the multiple video streams based on the information representing the user's field of vision. The network-implemented video processing server is further configured to generate the immersive video sub-stream based on the extracted sub-portion of the stitched video data.

In an embodiment, the network-implemented video processing server is configured to extract, based on the information representing the user's field of vision, a sub-portion of the stitched video data from the multiple video streams corresponding to an immersive video scene that is within the user's current field of vision.

In an embodiment, the network-implemented video processing server is configured to receive sensor data over a device-to-server media channel. The network-implemented video processing server is also configured to generate interactive media content based on the sensor data. The network-implemented video processing server is further configured to insert the interactive media content in the immersive video sub-stream.

It will be appreciated that the methods and devices described herein can be combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Particular examples include one or more suitably configured digital signal processors and other known electronic circuits, e.g. discrete logic gates interconnected to perform a specialized function, or Application Specific Integrated Circuits (ASICs).

FIG. 15 illustrates a particular hardware implementation of the network-implemented video processing server 100. The network-implemented video processing server 100 comprises a receiver 140 configured to receive the multiple video streams carrying video data corresponding to the full immersive video scene. The receiver 140 is also configured to receive the information representing the user's current field of vision over the control channel. The network-implemented video processing server 100 also comprises a stream generator 150 configured to generate the immersive video sub-stream. The network-implemented video processing server 100 further comprises a transmitter 160 configured to transmit the immersive video sub-stream to the user device over a video transport channel.

The receiver 140 is preferably connected to the stream generator 150 to forward the video data of the multiple video streams and the information representing the user's field of vision to the stream generator 150. The stream generator 150 is preferably connected to the transmitter 160 to forward the generated immersive video sub-stream to the transmitter 160 for transmission to the immersive video sub-stream to the user device over the video transport channel.

Alternatively, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

In a particular example, the network-implemented video processing server 100 comprises a processor 110 and a memory 120, see FIG. 16. The memory 120 comprises instructions executable by the processor 110, wherein the processor 110 is operative to generate the immersive video sub-stream as previously described herein.

In an embodiment, the network-implemented video processing server 100 preferably also comprises a communication circuitry 130. The communication circuitry 130 is configured to receive the multiple video streams carrying video data corresponding to the full immersive video scene. The communication circuitry 130 is also configured to receive the information representing the user's current field of vision over the control channel. The communication circuitry 130 is further configured to transmit the immersive video sub-stream to the user device over a video transport channel.

The communication circuitry 130 could be implemented as a receiver and transmitter pair or transceiver, such as for wireless communication. Alternatively, the communication circuitry 130 could be in the form of an input port and an output port, or a combined input/output (I/O) port, such as for wired communication. It is also possible to have communication circuitry 130 in the form of multiple receiver and transmitter pairs or transceivers, multiple input ports and output ports or I/O ports, or a combination or at least one receiver and transmitter pair or transceiver and at least one input port and output port or I/O port.

The processor 110, the memory 120 and the optional communication circuitry 130 are interconnected to each other to enable normal software execution.

FIG. 21 is a schematic block diagram illustrating an example of a computer implementation showing, in an embodiment, a network-implemented video processing server 500 comprising a processor 510 and an associated memory 520.

In this particular example, at least some of the steps, functions, procedures, modules and/or blocks described herein are implemented in a computer program 530, which is loaded into the memory 520 for execution by processing circuitry including one or more processors 510. The processor 510 and memory 520 are interconnected to each other to enable normal software execution. An optional communication circuitry 550 may also be interconnected to the processor 510 and/or the memory 520 to enable input and/or output of video data of multiple video streams, information representing the user's current field of vision and the immersive video sub-stream.

The network-implemented video processing server 500 is preferably implemented as a number of virtual machines running in the cloud. For instance, the network-implemented video processing server 500 could be implemented as a video stitching application executed by one or more virtual servers.

The term 'processor' should be interpreted in a general sense as any system or device capable of executing program code or computer program instructions to perform a particular processing, determining or computing task.

The processing circuitry including one or more processors is thus configured to perform, when executing the computer program, well-defined processing tasks such as those described herein.

The processing circuitry does not have to be dedicated to only execute the above-described steps, functions, procedure and/or blocks, but may also execute other tasks.

In a particular embodiment, the computer program 530 comprises instructions, which when executed by the processor 510, cause the processor 510 to generate an immersive video sub-stream by processing, based on information representing a user's current field of vision received over a control channel between a network-implemented video processing server 500 and a user device, video data from at least a portion of multiple video streams carrying video data corresponding to a full immersive video scene. The immersive video sub-stream carrying encoded video data corresponding to a sub-portion of the full immersive video scene.

The proposed technology also provides a carrier 540 comprising the computer program 530. The carrier 540 is one of an electronic signal, an optical signal, an electromagnetic signal, a magnetic signal, an electric signal, a radio signal, a microwave signal, or a computer-readable storage medium 540.

By way of example, the software or computer program 530 may be realized as a computer program product, which is normally carried or stored on a computer-readable medium 540, preferably non-volatile computer-readable storage medium 540. The computer-readable medium 540 may include one or more removable or non-removable memory devices including, but not limited to a Read-Only Memory (ROM), a Random Access Memory (RAM), a Compact Disc (CD), a Digital Versatile Disc (DVD), a Blueray disc, a Universal Serial Bus (USB) memory, a Hard Disk Drive (HDD) storage device, a flash memory, a magnetic tape, or any other conventional memory device. The computer program 530 may thus be loaded into the operating memory of a computer or equivalent processing device, represented by the network-implemented video processing server 500 in FIG. 21, for execution by the processor 510 thereof.

The flow diagram or diagrams presented herein may therefore be regarded as a computer flow diagram or diagrams, when performed by one or more processors. A corresponding network-implemented video processing server may be defined as a group of function modules, where each step performed by the processor corresponds to a function module. In this case, the function modules are implemented as a computer program running on the processor. Hence, the network-implemented video processing server may alternatively be defined as a group of function modules, where the function modules are implemented as a computer program running on at least one processor.

The computer program residing in memory may thus be organized as appropriate function modules configured to perform, when executed by the processor, at least part of the steps and/or tasks described herein. An example of such function modules is illustrated in FIG. 17.

Figure 17:
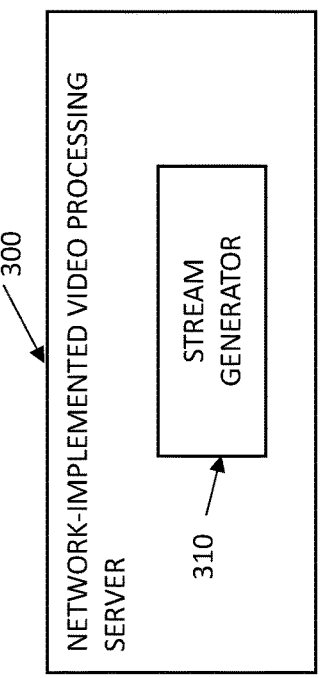
FIG. 17 is a block diagram of a network-implemented video processing server according to a further embodiment.

FIG. 17 is a schematic block diagram of a network-implemented video processing server 300 with function modules. The network-implemented video processing server 300 comprises a stream generator 310 for generating an immersive video sub-stream by processing, based on information representing a user's current field of vision received over a control channel between the network-implemented video processing server 300 and a user device, video data from at least a portion of multiple video streams carrying video data corresponding to a full immersive video scene. The immersive video sub-stream carrying encoded video data corresponding to a sub-portion of the full immersive video scene.

The stream generator 310 is in this embodiment enabled by corresponding software executable by one or more processors of the network-implemented video processing server 300, but they may in other embodiments be implemented as, e.g. pure hardware.

A further aspect of the embodiments relates to a user device. The user device is configured to transmit information representing a user's current field of vision over a control channel to a network-implemented video processing server. The user device is also configured to receive, on a video transport channel, an immersive video sub-stream carrying encoded video data corresponding to a sub-portion of a full immersive video scene. The user device is configured to decode the immersive video sub-stream to form decoded video data corresponding to the sub-portion of the full immersive video scene. The user device is further configured to output decoded video data for display.

In an embodiment, the user device is configured to receive the information representing the user's current field of vision from a head or eye tracking sensor.

In an embodiment, the user device is configured to receive, on the video transport channel, the immersive video sub-stream carrying encoded video data corresponding to an immersive video scene that is within the user's current field of vision as represented by the information representing the user's current field of vision.

In an embodiment, the user device is configured to receive, on the video transport channel, the immersive video sub-stream carrying encoded video data corresponding to an immersive video scene that is broader than the user's current field of vision but is smaller than the full immersive video scene. The user device is also configured to extract a sub-portion of the decoded video data corresponding to an immersive video scene that is within the user's current field of vision based on the information representing the user's current field of vision. The user device is further configured to output the sub-portion of the decoded video data for display.

In an embodiment, the user device is configured to transmit sensor data over a device-to-server media channel to the network-implemented video processing server. The user device is also configured to receive, on the video transport channel, the immersive video sub-stream carrying the encoded video data and interactive content generated based on the sensor data.

Figure 18:
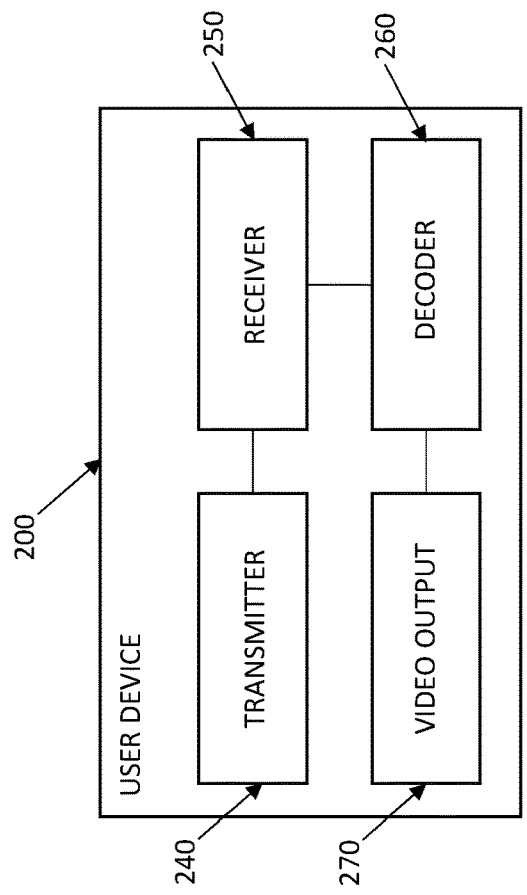
FIG. 18 is a block diagram of a user device according to an embodiment.

FIG. 18 illustrates a particular hardware implementation of the user device 200. The user device 200 comprises a transmitter 240 configured to transmit the information representing the user's current field of vision over the control channel. The user device 200 also comprises a receiver 250 configured to receive the immersive video sub-stream on the video transport channel. The user device 200 further comprises a decoder 260 configured to decode the immersive video sub-stream and a video output 270 configured to output video data for display.

The receiver 250 is preferably connected to the decoder 260 forward the encoded video data of the immersive video sub-stream to the decoder 260. The decoder 260 is in turn connected to the video output 270 to forward the decoded video data to the video output 270. In an optional embodiment, the transmitter 240 could be connected to the receiver 250 or the decoder 270 to forward the information of the user's current field of vision thereto to be used when determining which part of the encoded and stitched video data to output for display.

Alternatively, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more DSPs, one or more CPUs, video acceleration hardware, and/or any suitable programmable logic circuitry such as one or FPGAs, or one or more PLCs.

In a particular example, the user device 200 comprises a processor 210 and a memory 220, see FIG. 19. The memory 220 comprises instructions executable by the processor 210, wherein the processor 210 is operative to output the information representing the user's current field of vision for transmission over the control channel. The processor 210 is also operative to decode the immersive video sub-stream and output the decoded video data for display.

In an embodiment, the user device 200 preferably also comprises a communication circuitry 230. The communication circuitry 230 is configured to transmit the information representing the user's current field of vision over the control channel. The communications circuitry 230 is also configured to receive the immersive video sub-stream on the video transport channel.

The communication circuitry 230 could be implemented as a receiver and transmitter pair or transceiver, such as for wireless communication. Alternatively, the communication circuitry 230 could be in the form of an input port and an output port, or a combined I/O port, such as for wired communication. It is also possible to have communication circuitry 230 in the form of multiple receiver and transmitter pairs or transceivers, multiple input ports and output ports or I/O ports, or a combination or at least one receiver and transmitter pair or transceiver and at least one input port and output port or I/O port.

The processor 210, the memory 220 and the optional communication circuitry 230 are interconnected to each other to enable normal software execution.

FIG. 21 is a schematic block diagram illustrating an example of a computer implementation showing, in an embodiment, a user device 500 comprising a processor 510 and an associated memory 520.

In this particular example, at least some of the steps, functions, procedures, modules and/or blocks described herein are implemented in a computer program 530, which is loaded into the memory 520 for execution by processing circuitry including one or more processors 510. The processor 510 and memory 520 are interconnected to each other to enable normal software execution. An optional communication circuitry 550 may also be interconnected to the processor 510 and/or the memory 520 to enable input and/or output of the information representing the user's current field of vision and the immersive video sub-stream.

In a particular embodiment, the computer program 530 comprises instructions, which when executed by the processor 510, cause the processor 510 to transmit information representing a user's current field of vision over a control channel to a network-implemented video processing server. The processor 510 is also caused to receive, on a video transport channel, an immersive video sub-stream carrying encoded video data corresponding to a sub-portion of a full immersive video scene. The processor 510 is further caused to decode the immersive video sub-stream to form decoded video data corresponding to the sub-portion of the full immersive video scene and output decoded video data for display.

The proposed technology also provides a carrier 540 comprising the computer program 530. The carrier 540 is one of an electronic signal, an optical signal, an electromagnetic signal, a magnetic signal, an electric signal, a radio signal, a microwave signal, or a computer-readable storage medium 540.

The computer program 530 may thus be loaded into the operating memory of a computer or equivalent processing device, represented by the user device 500 in FIG. 21, for execution by the processor 510 thereof.

The flow diagram or diagrams presented herein may therefore be regarded as a computer flow diagram or diagrams, when performed by one or more processors. A corresponding user device may be defined as a group of function modules, where each step performed by the processor corresponds to a function module. In this case, the function modules are implemented as a computer program running on the processor. Hence, the network-implemented video processing server may alternatively be defined as a group of function modules, where the function modules are implemented as a computer program running on at least one processor.

The computer program residing in memory may thus be organized as appropriate function modules configured to perform, when executed by the processor, at least part of the steps and/or tasks described herein. An example of such function modules is illustrated in FIG. 20.

FIG. 20 is a schematic block diagram of a user device 400 with function modules. The user device 400 comprises an output for transmitting information representing a user's current field of vision over a control channel to a network-implemented video processing server. The user device 400 also comprises an input 420 for receiving, on a video transport channel, an immersive video sub-stream carrying encoded video data corresponding to a sub-portion of a full immersive video scene. The user device 400 further comprises a decoder 430 for decoding the immersive video sub-stream to form decoded video data corresponding to the sub-portion of the full immersive video scene. The user device 400 additionally comprises a video output 440 for outputting decoded video data for display.

The functional modules 410-440 are in this embodiment enabled by corresponding software executable by one or more processors of the network-implemented video processing server 400, but they may in other embodiments be implemented as, e.g. pure hardware.

The user device may be implemented as various devices including a HMD, a computer, a smart phone, a mobile telephone, a laptop, a note pad, possible such a device comprising or connected to a HMD.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

The invention claimed is:

1. A method for processing immersive video, said method comprising:
   a network-implemented video processing server generating an immersive video sub-stream, wherein generating the immersive video sub-stream comprises:
   obtaining information representing a user's current field of vision received over a control channel between said network-implemented video processing server and a user device; and
   processing, based on said obtained information representing the user's current channel field of vision received over the control between said network-implemented video processing server and the user device, video data from at least a portion of multiple video streams carrying video data corresponding to a full immersive video scene, said immersive video sub-stream carrying encoded video data corresponding to a sub-portion of said full immersive video scene,
   wherein said network-implemented video processing server is configured to receive sensor data over a device-to-server media channel;
   wherein said network-implemented video processing server is configured to generate interactive media content based on said sensor data;
   wherein said network-implemented video processing server inserting said interactive media content in said immersive video sub-stream;
   wherein said network-implemented video processing server is further configured to the sub-portion of said multiple video streams based on said information, and
   wherein said network-implemented video processing server is further configured to select, based on said information, video streams of said multiple video stream carrying said video data corresponding to an immersive video that is within said user's current field of vision.

2. The method of claim 1, further comprising said network-implemented video processing server receiving said multiple video streams carrying video data corresponding to said full immersive video scene.

3. The method of claim 1, further comprising:
   said network-implemented video processing server receiving said information over said control channel; and
   said network-implemented video processing server transmitting said immersive video sub-stream to said user device over a video transport channel.

4. The method of claim 1, wherein said network-implemented video processing server generating said immersive video sub-stream comprises:
   said network-implemented video processing server generating said immersive video sub-stream by stitching together video data from said selected sub-portion of said multiple video streams.

5. A network-implemented video processing server, wherein the network-implemented video processing server is configured to generate an immersive video sub-stream by processing, based on information representing a user's current field of vision received over a control channel between said network-implemented video processing server and a user device, video data from at least a portion of multiple video streams carrying video data corresponding to a full immersive video scene, said immersive video sub-stream carrying encoded video data corresponding to a sub-portion of said full immersive video scene,
   wherein said network-implemented video processing server is configured to receive sensor data over a device-to-server media channel;
   wherein said network-implemented video processing server is configured to generate interactive media content based on said sensor date;
   wherein said network-implemented video processing server inserting said interactive media content in said immersive video sub-stream;
   wherein said network-implemented video processing server is further configured to the sub-portion of said multiple video streams based on said information, and
   wherein said network-implemented video processing server is further configured to select, based on said information, video streams of said multiple video stream carrying said video data corresponding to an immersive video that is within said user's current field of vision.

6. The network-implemented video processing server of claim 5, wherein said network-implemented video processing server is configured to receive said multiple video streams carrying video data corresponding to said full immersive video scene.

7. The network-implemented video processing server of claim 5, wherein
   said network-implemented video processing server is configured to receive said information over said control channel; and
   said network-implemented video processing server is configured to transmit said immersive video sub-stream to said user device over a video transport channel.

8. The network-implemented video processing server of claim 5, wherein said network-implemented video processing server is configured to generate said immersive video sub-stream by stitching together video data from said selected sub-portion of said multiple video streams.

9. The network-implemented video processing server of claim 8, wherein said network-implemented video processing server is configured to select, based on said information, video streams of said multiple video stream carrying video data corresponding to an immersive video scene that is broader than said user's current field of vision but is smaller than said full immersive video scene.

10. The network-implemented video processing server of claim 9, wherein
    said network-implemented video processing server is configured to analyze video data of said multiple video streams and identify a target content in said analyzed video data;
    said network-implemented video processing server is configured to select, based on said information, video streams of said multiple video streams carrying video data corresponding to an immersive video scene that is within said user's current field of vision; and
    said network-implemented video processing server is configured to select at least one video stream carrying video data corresponding to said identified target content.

11. The network-implemented video processing server of claim 5, wherein
    said network-implemented video processing server is configured to stitch together video data from said multiple video streams to form said full immersive video scene;

said network-implemented video processing server is configured to extract a sub-portion of said stitched video data from said multiple video streams based on said information; and said network-implemented video processing server is configured to generate said immersive video sub-stream based on said extracted sub-portion of said stitched video data.

12. The network-implemented video processing server of claim 11, wherein said network-implemented video processing server is configured to extract, based on said information, a sub-portion of said stitched video data from said multiple video streams corresponding to an immersive video scene that is within said user's current field of vision.

13. The network-implemented video processing server of claim 5, comprising: a processor; and a memory comprising instructions executable by said processor, wherein said processor is operative to generate said immersive video sub-stream.

14. The network-implemented video processing server of claim 13, comprising a communication circuitry configured to i) receive said multiple video streams carrying video data corresponding to said full immersive video scene, ii) receive said information over said control channel, and iii) transmit said immersive video sub-stream to said user device over a video transport channel.

15. The network-implemented video processing server of claim 5, comprising:
a receiver configured to i) receive said multiple video streams carrying video data corresponding to said full immersive video scene, and ii) receive said information over said control channel;
a stream generator configured to generate said immersive video sub-stream; and
a transmitter configured to transmit said immersive video sub-stream to said user device over a video transport channel.

16. A user device, wherein
said user device is configured to transmit information representing a user's current field of vision over a control channel to a network-implemented video processing server;
said user device is configured to receive, on a video transport channel, an immersive video sub-stream carrying encoded video data corresponding to a sub-portion of a full immersive video scene,
wherein said network-implemented video processing server is configured to receive sensor data over a device-to-server media channel;
wherein said network-implemented video processing server is configured to generate interactive media content based on said sensor data;
wherein said network-implemented video processing server inserting said interactive media content in said immersive video sub-stream;
wherein said user device is configured to receive, on said video transport channel, said immersive video sub-stream carrying encoded video data corresponding to an immersive video scene that is within said user's current field of vision as represented by said information;

said user device is configured to decode said immersive video sub-stream to form decoded video data corresponding to said sub-portion of said full immersive video scene; and said user device is configured to output decoded video data for display.

17. The user device of claim 16, wherein said user device is configured to receive said information from a head or eye tracking sensor.

18. The user device of claim 16, wherein
said user device is configured to receive, on said video transport channel,
said immersive video sub-stream carrying encoded video data corresponding to an immersive video scene that is broader than said user's current field of vision but is smaller than said full immersive video scene;
said user device is configured to extract a sub-portion of said decoded video data corresponding to an immersive video scene that is within said user's current field of vision based on said information; and
said user device is configured to output said sub-portion of said decoded video data for display.

19. The user device of claim 16, wherein
said user device is configured to transmit sensor data over a device-to-server media channel to said network-implemented video server; and
said user device is configured to receive, on said video transport channel, said immersive video sub-stream carrying said encoded video data and interactive content generated based on said sensor data.

20. The user device of claim 16, comprising:
a processor; and
a memory comprising instructions executable by said processor, wherein said processor is operative to:
output said information for transmission over said control channel;
decode said immersive video sub-stream; and
output said decoded video data for display.

21. The user device of claim 20, comprising a communication circuitry configured to:
transmit said information over said control channel; and
receive said immersive video sub-stream on said video transport channel.

22. The user device of claim 16, comprising:
a transmitter configured to transmit said information over said control channel;
a receiver configured to receive said immersive video sub-stream on said video transport channel;
a decoder configured to decode said immersive video sub-stream; and
a video output configured to output decoded video data for display.

* * * * *